J. T. CADENHEAD.
DEMOUNTABLE RIM CONSTRUCTION.
APPLICATION FILED FEB. 4, 1920.
1,378,763.
Patented May 17, 1921.
3 SHEETS—SHEET 1.
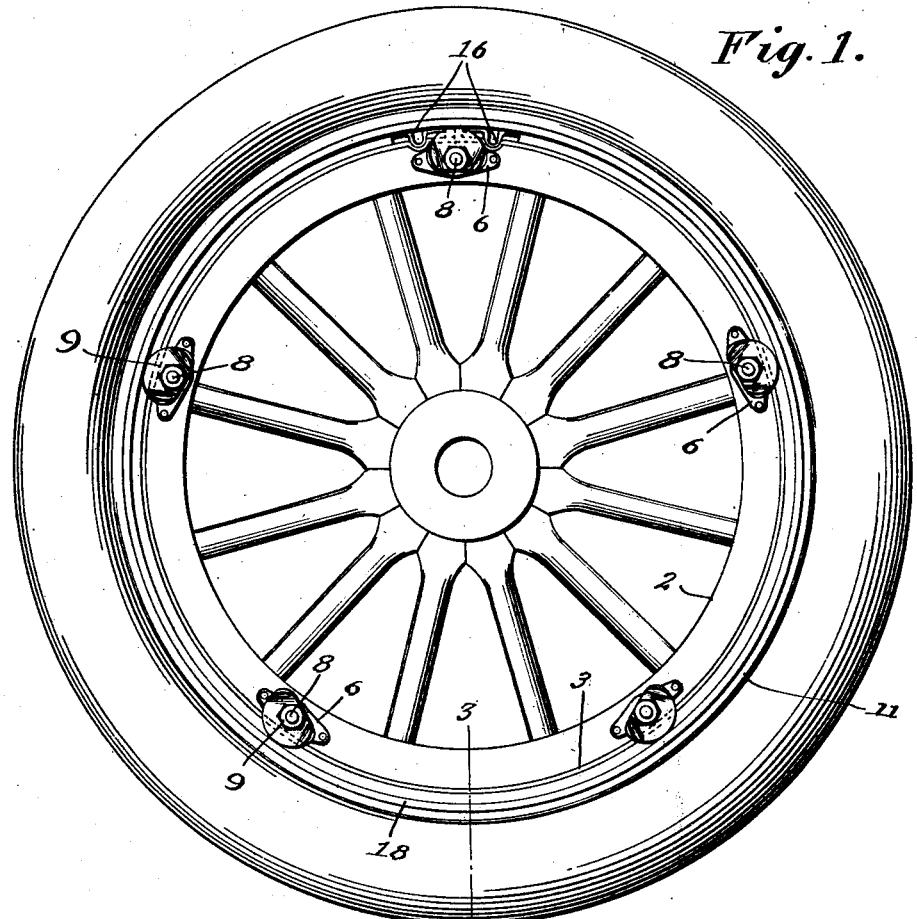
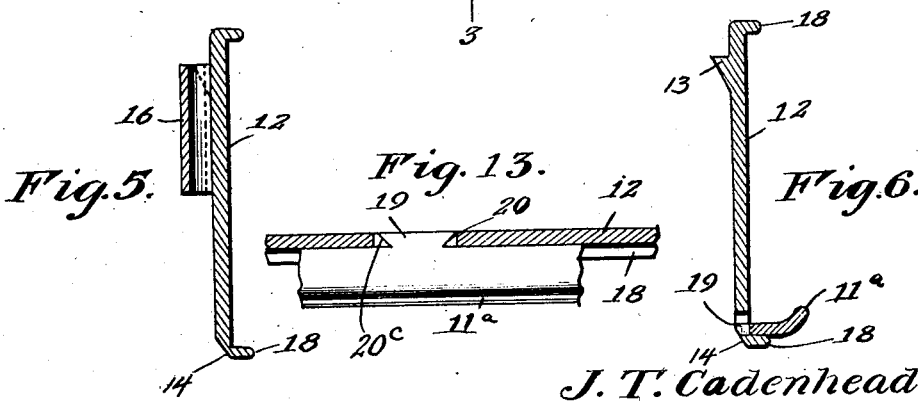

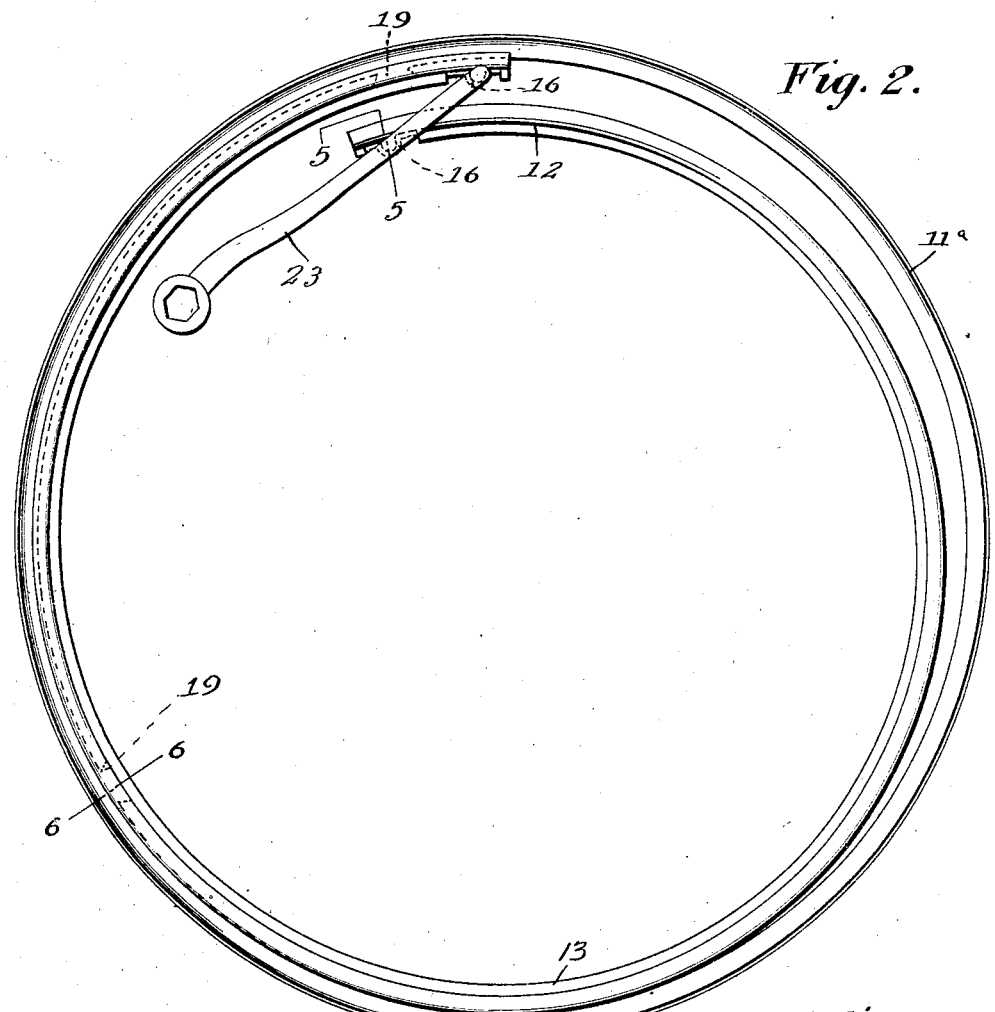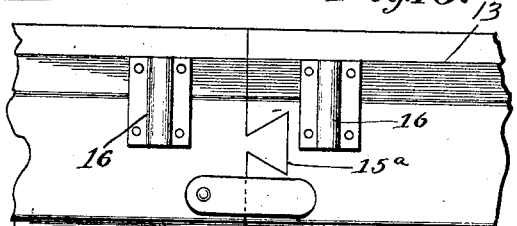

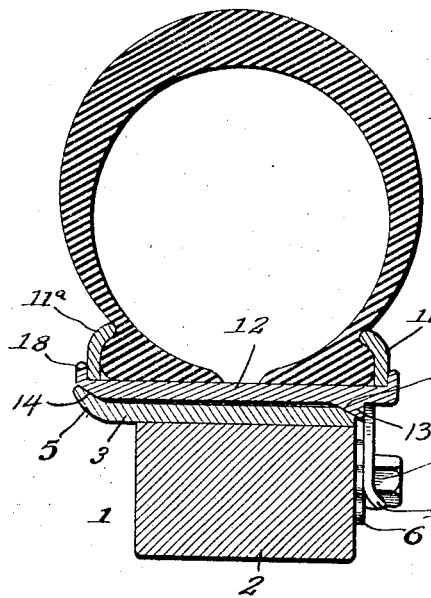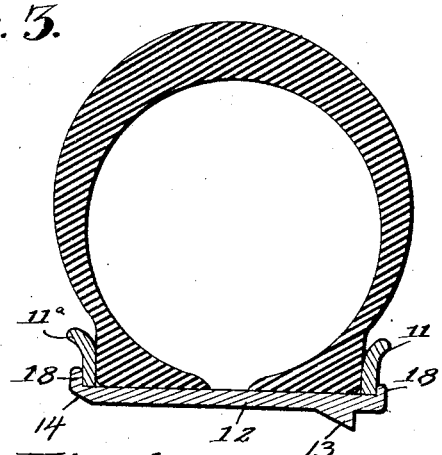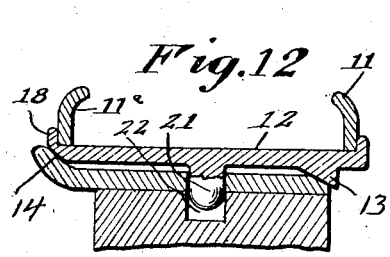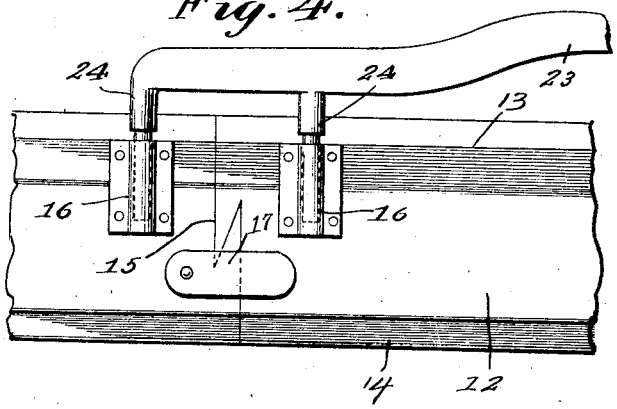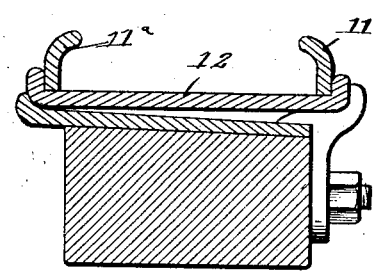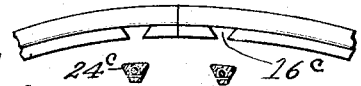

UNITED STATES PATENT OFFICE.

JOHN T. CADENHEAD, OF ENSLEY, ALABAMA.

DEMOUNTABLE-RIM CONSTRUCTION.

1,378,763.  Specification of Letters Patent.  Patented May 17, 1921.

Application filed February 4, 1920. Serial No. 356,174.

*To all whom it may concern:*

Be it known that I, JOHN T. CADENHEAD, a citizen of the United States, residing at Ensley, in the county of Jefferson and State of Alabama, have invented new and useful Improvements in Demountable-Rim Construction, of which the following is a specification.

The object of my present invention is the provision of a demountable rim construction that is advantageous because of the facility with which a tire may be attached to and detached from the felly band of a vehicle wheel, and also because of its eminently practical character and the safe and strong manner in which the tire casing is normally held on the wheel.

To the attainment of the foregoing the invention consists in the improvement as hereinafter described and definitely claimed.

In the accompanying drawings, hereby made a part hereof:

Figure 1 is a side elevation showing complete the best practical embodiment of my invention of which I am aware.

Fig. 2 is a side elevation showing the split rim of the improvement in its contracted state.

Fig. 3 is a transverse section taken in the plane indicated by the line 3—3 of Fig. 1.

Fig. 4 is an enlarged fragmentary view taken from a point within the split rim and looking toward the joint between the ends of the rim, and showing as properly applied the implement through which the rim is manipulated.

Figs. 5 and 6 are transverse sections taken in the planes indicated by the lines 5—5 and 6—6, respectively, of Fig. 2.

Fig. 7 is a transverse section showing the rings of the improvement reversed and associated with a tire casing having straight sides.

Fig. 8 is a detail view of one of the locking elements.

Fig. 9 is a transverse section showing the arrangement of each locking element relatively to a beveled plate fixed on the side of the felly band.

Fig. 10 is a detail view showing a modification of the opposed ends of the rim.

Fig. 11 is a detail section showing the arrangement of my novel rim relatively to an old style felly band and old style rim-retaining means.

Fig. 12 is a modification showing a dowel pin that may be employed on the rim and socketed in an aperture in the felly band to preclude creeping of the rim about the felly band.

Fig. 13 is a detail showing the preferred manner of securing the stud 19 on the locking ring 11$^a$ to the rim.

Fig. 14 comprises disconnected views of a modified rim and manipulating tool portions hereinafter explicitly referred to.

Similar numerals designate corresponding parts in Figs. 1 to 9 to which reference will first be had.

The carrying out of my invention contemplates the employment of a wooden felly 2 and a metallic felly band 3. The said band 3 is suitably secured on the wooden felly and has one of its edges beveled, as indicated by 4, and also has its opposite edge extended beyond the adjacent side of the felly to afford a retaining flange 5. Fixed at intervals to the side of the felly band adjacent to the beveled corner or edge 4, are metallic bearing plates 6, the outer side of each of which is beveled toward the perimeter of the felly band, as indicated by 7. The plates 6 carry threaded posts 8, and on said posts are mounted locking elements 9 that are respectively made up of an angular nut portion, and a base flange, the said base flange having the outwardly deflected corners 10. The beveled surfaces 7 of the bearing plates 6 serve to pitch or incline the locking elements 9 laterally inward, so as to enable the said locking elements to more tightly engage the adjacent portion of the rim, hereinafter described, and the deflected corners 10 facilitate the turning of the locking elements 9, inasmuch as said corners are adapted to readily pass the rim.

At 12 is the split rim of my improvement, an important characteristic of which rim is its capacity to be contracted and expanded by the radial movement of one of its end portions relatively to the other end portion. The said rim 12 is of metal and springy or resilient, and interiorly it is provided adjacent to one edge with a transversely tapered annular abutment 13, while its opposite edge is beveled, as indicaed by 14. The meeting and abuttng ends of the rim 12 are preferably, though not necessarily, interlocked, as indicated by 15 in Fig. 4, this provision being made in order to prevent undue lateral inward movement of either end portion relatively to the other end portion. In lieu of the interlocking 15, Fig. 4, I may employ the interlocking 15ª of Fig. 10, the latter including a dove-tail tongue and a dove-tail recess, as illustrated. It will be noticed here, however, that neither of the said interlocking arrangements is likely to interfere in any measure with the radial movement of one end portion of the rim 12 relatively to the other end portion thereof. The rim 12 is also provided interiorly with transverse apertured lugs 16; the said lugs 16 being riveted or otherwise fixedly attached to the rim, and being disposed transversely, and being locked each at a slight distance from one end portion of the rim. I also prefer to employ on the inner side of the rim 12 a turn-button 17 which is pivoted to one end portion and is adapted to reach over the joint between the end portions, and has for its function when so disposed, to retain the ends of the rim in their abutting relation. Exteriorly the rim 12 is provided with edge flanges 18, the function of which is to hold against lateral outward movement the tire-locking rings 11 and 11ª. At this point I would have it understood that it is within the purview of my invention to provide the tire-locking ring 11ª with two or more inwardly reaching studs 19, designed to be seated in apertures 20 in the rim 12. I prefer to employ this provision in order to retain the ring 11ª on the rim when the tire is removed from the rim, but I do not desire to be understood as confining myself to the same.

As will be readily noted from the drawings, the tire-locking rings 11 and 11ª are each of curved form in cross-section. From this it follows that in the positions shown in Fig. 3, the said rings 11 and 11ª are adapted to securely hold a clencher tire, and that when the rings are reversed as shown in Fig. 7, they are adapted for coöperation with a straight-sided tire.

As will be apparent by reference to Fig. 11, the rim 12 and the locking rings 11 and 11ª, are adapted for use on the old style felly band, and to be secured on said band by the usual locking elements. I would also have it understood at this point that when desired the rim 12 may be provided with an inwardly-reaching dowel 21, designed to be seated in a socket 22 in the felly band of a wheel, with a view to effectively preventing creeping of the rim about the band.

I have also shown in the drawings the removable implement through the medium of which the rim 12 is manipulated for the ready attachment and detachment of a tire. The said implement includes a handle 23 and two arms 24 that reach at right angles from the handle and are spaced apart and are adapted to be firmly or snugly, though removably socketed in the lugs 16 on the end portions of the rim.

In the practical use of my improvement, and while the rim 12 is in a contracted state as shown in Fig. 2, and the ring 11ª is properly positioned about the rim, a tire may be quickly and conveniently moved laterally on and off the rim. When, for instance, while the rim is in a contracted state, and a tire is moved laterally upon the rim and so as to bring up against the locking ring 11ª, the tire is firmly attached to the rim first, by placing the locking ring 11 on the rim 12 and within the adjacent edge flange thereof and against the tire, and second, by swinging the implement so as to thrust the innermost end portion of the split rim radially outward and longitudinally, until its end is opposed to and made to abut against the opposite end of the rim. Because of the resilient character of the rim, the manipulated end portion alluded to will tend of itself to remain in the position stated with its end abutting against and alined with the opposite end of the rim, and by the same token, it will be understood that when the rim 12 is contracted by the inward radial and longitudinal movement of the manipulated end portion, the said end portion will tend to remain in the inner position and lapped relation to the other end portion while a tire is being placed on or removed from the rim. After the end portions of the rim are brought into opposed and alined relation as stated, the turn-button 17 which is preferably, though not necessarily employed, is turned to its longitudinal position, so as to reach over the point between the ends of the rim and thereby serve to preclude casual inward movement of the manipulated end portion relatively to the other end portion. From this it follows that when the turn-button 17 is employed, it is necessary to swing the same to a position at right angles to its longitudinal position, as a condition precedent to the inward longitudinal movement of the one end portion of the rim relatively to the other.

After the tire is attached in the manner described to the rim 12, the said rim 12 is slipped laterally on the felly band 3 until the rounded edge 14 of the rim 12 brings up against the flange 5 of the felly band 3, and its annular abutment 13 brings up against the beveled corner 4 of the felly band. When the locking elements 9 are turned on the posts 8, to engage the opposed portion of abutment 13 of the rim 12, the said rim 12 and the parts carried thereby will be strongly secured on the felly band and against accidental lateral displacement.

When it is desired to remove rim 12 and the parts carried thereby from the felly band, the operation described is reversed, and subsequently to the removal of the rim and the parts carried thereby from the felly band, the rim 12 may be expeditiously and easily contracted for the removal of the tire thereon and the placing of a fresh tire on the rim.

By comparison of Figs. 6 and 13 it will be understood that in the preferred embodiment of my invention, the studs 19 on the locking ring 11$^a$ are of dove-tail form in side elevation and the end walls of the outer portions of the apertures 20 in rim 12 are undercut as indicated by 20$^c$, Fig. 13. Thus in applying the ring 11$^a$ to the rim 12 it will be understood that the studs 19 are first disposed in the inner portions of the apertures 20 and then on lateral outward movement of the locking ring 11$^a$, the dove-tail studs 19 will be interlocked with the undercut portions 20$^c$, with the result that the studs 19 will be held against radial movement relatively to the rim 12 and the ring 11$^a$ will be strongly held on the rim.

As shown in Fig. 14 dove-tail grooves 16$^c$ may be formed in the rim 12$^c$, and the lateral portions 24$^c$ of the handle 23 may be of dove-tail form and mounted to turn about their axes; said portions 24$^c$ being socketed in the grooves 16$^c$ when the handle is applied and manipulated in the manner and for the purpose hereinbefore set forth.

Having described my invention, what I claim and desire to secure by Letters-Patent, is:

A split, resilient, radially-contractible, demountable rim having at its inner side adjacent to its ends means for the engagement of a manipulating implement; one end portion of said rim being movable longitudinally and radially to and from an inner position in lapped and spaced relation to the other end portion thereof, and the rim being provided with shallow exterior edge flanges, in combination with tire-locking rings at the inner sides of the exterior flanges of the rim and in and against which the rim is capable of being expanded; the rim having apertures the end wall of the inner portions of which are under-cut, and one of the tire-locking rings being provided with dove-tail studs for coöperation with said apertures and the under-cut end portions thereof.

In testimony whereof I affix my signature.

JOHN T. CADENHEAD.